United States Patent
Bowen et al.

(10) Patent No.: US 7,970,914 B2
(45) Date of Patent: *Jun. 28, 2011

(54) METHODS AND SYSTEMS FOR PROVISIONING NETWORK SERVICES

(75) Inventors: Donald J. Bowen, Madison, NJ (US); Richard H. Erving, Encinitas, CA (US); Robert R. Miller, Convent Station, NJ (US); John F. Murray, Denville, NJ (US); Christopher W. Rice, Parsippany, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/624,716

(22) Filed: Nov. 24, 2009

(65) Prior Publication Data

US 2010/0067407 A1   Mar. 18, 2010

Related U.S. Application Data

(63) Continuation of application No. 10/748,955, filed on Dec. 30, 2003, now Pat. No. 7,627,679.

(51) Int. Cl.
- *G06F 15/16* (2006.01)
- *H04M 15/00* (2006.01)
- *H04L 12/26* (2006.01)

(52) U.S. Cl. ........ 709/227; 709/225; 709/226; 709/228; 709/229; 379/142.04; 379/100.16; 379/88.04; 370/252; 370/254; 370/401

(58) Field of Classification Search .......... 709/227–229; 370/252, 254, 401; 379/142.01–142.18, 379/100.16, 88.01–88.28

See application file for complete search history.

(56) References Cited

U.S. PATENT DOCUMENTS

| | | | |
|---|---|---|---|
| 5,526,406 A | * | 6/1996 | Luneau .................... 455/563 |
| 5,548,814 A | | 8/1996 | Lorang et al. |
| 5,633,888 A | | 5/1997 | Stewart |
| 5,654,959 A | | 8/1997 | Baker et al. |
| 5,655,219 A | | 8/1997 | Jusa et al. |
| 5,657,317 A | | 8/1997 | Mahany et al. |
| 5,678,002 A | * | 10/1997 | Fawcett et al. ............ 715/709 |
| 5,682,381 A | | 10/1997 | Sekihata et al. |
| 5,684,801 A | | 11/1997 | Amitay et al. |
| 5,696,903 A | | 12/1997 | Mahany |
| 5,724,346 A | | 3/1998 | Kobayashi et al. |
| 5,768,531 A | | 6/1998 | Lin |

(Continued)

OTHER PUBLICATIONS

MSN Encarta Dictionary (2009), Available: http://encarta.msn.com/encnet/features/dictionary/DictionaryResults.aspx?refid=1861621587 (Accessed Jan. 30, 2009).

(Continued)

*Primary Examiner* — Brendan Higa

(74) *Attorney, Agent, or Firm* — Akerman Senterfitt; Michael K. Dixon

(57) ABSTRACT

Certain exemplary embodiments provide a method, comprising: automatically detecting at an agent an installation of a communications device to a local network coupled to the agent; automatically offering via the communications device a plurality of user-selectable service options relating to a service provider's network and relating to at least one capability of the communications device, the at least one capability detected by the agent; in response to a selection of at least one service option from the plurality of service options, providing via the agent a user connection address.

15 Claims, 3 Drawing Sheets

U.S. PATENT DOCUMENTS

| | | | |
|---|---|---|---|
| 5,781,536 | A | 7/1998 | Ahmadi et al. |
| 5,796,727 | A | 8/1998 | Harrison et al. |
| 5,852,405 | A | 12/1998 | Yoneda et al. |
| 5,870,385 | A | 2/1999 | Ahmadi et al. |
| 5,923,702 | A | 7/1999 | Brenner et al. |
| 5,949,776 | A | 9/1999 | Mahany et al. |
| 5,991,292 | A | 11/1999 | Focsaneanu et al. |
| 6,028,984 | A * | 2/2000 | Kimball .................. 709/249 |
| 6,061,563 | A | 5/2000 | Lee |
| 6,067,297 | A | 5/2000 | Beach |
| 6,374,307 | B1 | 4/2002 | Ristau et al. |
| 6,438,123 | B1 * | 8/2002 | Chapman .................. 370/351 |
| 6,792,082 | B1 * | 9/2004 | Levine .................. 379/67.1 |
| 6,795,846 | B1 | 9/2004 | Merriam |
| 6,862,291 | B2 | 3/2005 | Talpade |
| 6,868,268 | B2 | 3/2005 | Worsham et al. |
| 6,938,079 | B1 | 8/2005 | Anderson et al. |
| 6,965,868 | B1 | 11/2005 | Bednarek |
| 6,976,258 | B1 | 12/2005 | Goyal et al. |
| 7,065,070 | B1 * | 6/2006 | Chang .................. 370/352 |
| 7,080,321 | B2 | 7/2006 | Aleksander et al. |
| 7,088,677 | B1 | 8/2006 | Burst |
| 7,165,109 | B2 | 1/2007 | Chiloyan et al. |
| 7,188,179 | B1 | 3/2007 | Hanson et al. |
| 7,281,046 | B1 | 10/2007 | Sunderasan et al. |
| 2002/0049727 | A1 | 4/2002 | Rothkopf |
| 2002/0056058 | A1 | 5/2002 | Nishio et al. |
| 2002/0095501 | A1 | 7/2002 | Chiloyan et al. |
| 2002/0116282 | A1 | 8/2002 | Martin et al. |
| 2002/0131123 | A1 * | 9/2002 | Clark .................. 359/154 |
| 2003/0023451 | A1 | 1/2003 | Willner et al. |
| 2003/0023717 | A1 * | 1/2003 | Lister .................. 709/224 |
| 2003/0028419 | A1 | 2/2003 | Monaghan |
| 2003/0055945 | A1 | 3/2003 | Bear |
| 2003/0120750 | A1 | 6/2003 | Gaxiola |
| 2003/0148777 | A1 | 8/2003 | Watanabe et al. |
| 2003/0169752 | A1 | 9/2003 | Chen |
| 2003/0172112 | A1 * | 9/2003 | Vignaud .................. 709/203 |
| 2003/0172170 | A1 | 9/2003 | Johnson |
| 2004/0004968 | A1 | 1/2004 | Nassar |
| 2004/0038672 | A1 | 2/2004 | Nguyen et al. |
| 2004/0049450 | A1 | 3/2004 | Lussler |
| 2004/0116108 | A1 | 6/2004 | Ra |
| 2004/0116140 | A1 * | 6/2004 | Babbar et al. .................. 455/517 |
| 2004/0133689 | A1 | 7/2004 | Vasisht |
| 2004/0252698 | A1 | 12/2004 | Anschultz et al. |
| 2005/0203835 | A1 | 9/2005 | Nhaissi et al. |
| 2005/0250470 | A1 * | 11/2005 | Wen et al. .................. 455/405 |
| 2006/0008073 | A1 * | 1/2006 | Yoshizawa et al. ...... 379/266.07 |
| 2006/0039381 | A1 | 2/2006 | Anschultz et al. |
| 2006/0067323 | A1 * | 3/2006 | Beck et al. .................. 370/395.2 |
| 2006/0126601 | A1 | 6/2006 | Kim et al. |
| 2007/0165599 | A1 | 7/2007 | Skog et al. |

OTHER PUBLICATIONS

Priggouris, et al, "SIP-based Location Aware Services, 2002 International Conference on Software", Telecommunications and Computer Networks, Oct. 2002.

Dana Pavel, et al, "Context Provisioning and SIP Events", Nokia Research, 5 Wayside Road, Burlington, MA 01803, USA.

Weil Li, "A Service Oriented SIP Infrastructure for Adaptive and Context-aware wireless services", Department of Computer and Systems Sciences Royal Institute of Technology.

Wobus, "DHCP FAQ", Oct. 26, 1998, 15 pages, http://www.dhcp-handbook.com/dhcp.sub.--faq.html.

* cited by examiner

METHODS AND SYSTEMS FOR PROVISIONING NETWORK SERVICES

BACKGROUND

United States Patent Application 20030172170, which is incorporated by reference herein in its entirety, allegedly cites that a "communications system and method is provided that includes multiple networked devices connected in a local area network and connected, via a gateway having enhanced functionality, to a wide area network such as the Internet using one or more Internet service providers. The system includes a source routing device (130), at least two networked customer premise equipment devices (118, 120), a gateway (123) for controlling communication between the source routing device (130) and the customer premise equipment devices (118, 120) and an address server (132) for providing the gateway (123) with at least two dynamically assigned Internet protocol addresses corresponding to different Internet service providers (138, 140) to enable each of the customer premise equipment devices (118, 120) to establish simultaneous connections with the different Internet service providers (138, 140)." See Abstract.

United States Patent Application 20030169752, which is incorporated by reference herein in its entirety, allegedly cites that a "integrated phone-based home gateway system is disclosed. The integrated phone-based home gateway system includes a broadband communication device, such as digital subscriber line ('DSL') device, an analog modem, a wireless interface, integrated into a screen-phone for providing broadband communication service to home users. Multiple home users are able to access the Internet and the content services for conducting e-commerce, receiving content news, entertaining on-demand, making audio or video communications, and telecommuting or working at home. This screen-phone based, modular, plug-n-play home gateway interface allows in-home as well as to-home networking, provides automatic data and broadband initialization, configuration and service provisioning, routing and bridging functionality and allows resource sharing among home devices via the existing phone wire, wireless, coaxial or optical cable connections." See Abstract.

United States Patent Application 20030055945, which is incorporated by reference herein in its entirety, allegedly cites a "services definition language for seamlessly creating and maintaining services over a network service reduces deployment time, cost, and maintenance, and increases reliability. An executable element generator is operable to process module scripts, such as an XML (Extensible Markup Language) script, recognized across the execution environment. Each module script describes a network element, service, or subscription. A plurality of available services are defined, in which each of the available services corresponds to one or more of the module scripts. A script processor interprets the module script and provides it to executable element generators conversant in the script language, which process the module scripts via a GUI to produce executable objects. A service provisioning engine is operable to execute the executable objects for providing the corresponding service via the network." See Abstract.

United States Patent Application 20030120750, which is incorporated by reference herein in its entirety, allegedly cites that the "provisioning of user preferences to a device or service is described. According to one embodiment of the invention, upon detecting a coupling of a device, a presumed user of the device is determined. The user preferences of the presumed user are retrieved and used to configure the device. In addition, particular services are loaded and unloaded from the device based on the user preferences of the presumed user of the device." See Abstract.

BRIEF DESCRIPTION OF THE DRAWINGS

A wide variety of potential embodiments will be more readily understood through the following detailed description, with reference to the accompanying drawings in which.

SUMMARY

Figure 1:
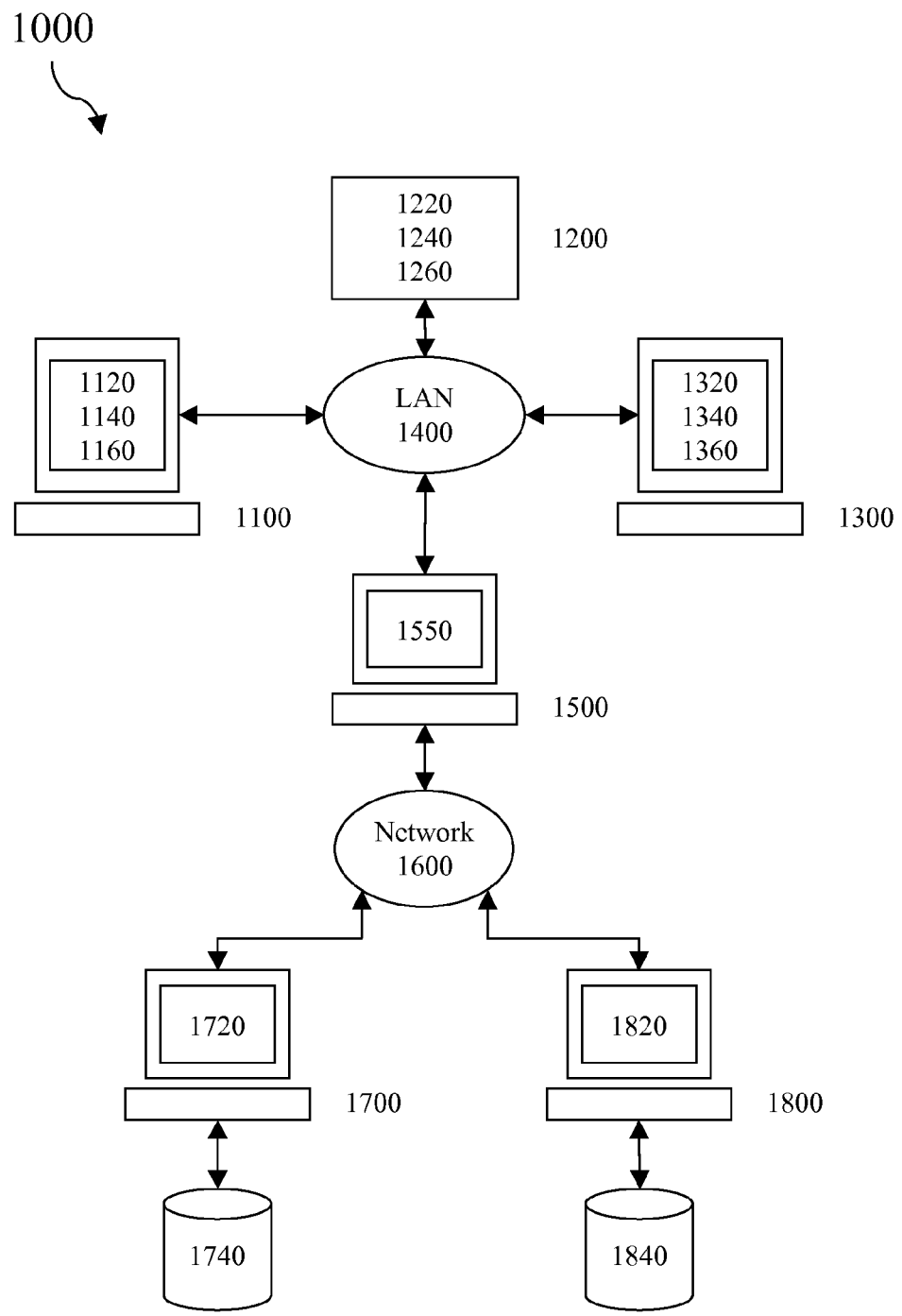
FIG. 1 is a block diagram of an exemplary embodiment of a system 1000.

Certain exemplary embodiments provide a method, comprising: automatically detecting at an agent an installation of a communications device to a local network coupled to the agent; automatically offering via the communications device a plurality of user-selectable service options relating to a service provider's network and relating to at least one capability of the communications device, the at least one capability detected by the agent; in response to a selection of at least one service option from the plurality of service options, providing via the agent a user connection address.

DEFINITIONS

When the following terms are used herein, the accompanying definitions apply:

user—a customer or recipient of a service.
request—an expression of human desire.
service—an activity provided for the benefit of another.
service provider—an entity that offers to provide a service via a network.
network—a communicatively-coupled plurality of communication devices. Examples include wired and/or wireless communications networks, such as public, private, circuit-switched, packet-switched, connectionless, virtual, radio, telephone, POTS, non-POTS, PSTN, non-PSTN, cellular, cable, DSL, satellite, microwave, twisted pair, IEEE 802.03, Ethernet, token ring, local area, wide area, IP, Internet, intranet, wireless, Ultra Wide Band (UWB), Wi-Fi, BlueTooth, Airport, IEEE 802.11, IEEE 802.11a, IEEE 802.11b, IEEE 802.11g, X-10, and/or electrical power networks, etc., and/or any equivalents thereof.
agent—a set of instructions comprised in hardware, firmware, and/or software.
installation—a state of being installed.
premises—land and/or the buildings on it.
coupling—the act of linking together.
physical connection—a tangible link.
automatically—acting or operating in a manner essentially independent of external influence or control. For example, an automatic light switch can turn on upon "seeing" a person in its view, without the person manually operating the light switch.
detecting—the act of sensing or perceiving.
communications device—an information device comprising at least three of the following capabilities: processing, transmitting, receiving, and rendering.
local network—a network located substantially on the same premises as the user.

service options—collections of parameters relating to a service or multiple services. For example, for an e-mail service, a user selectable e-mail address, a quantity of e-mail addresses, an e-mail server storage capacity, a service provider network connection speed, a number of connectable communications devices, an e-mail pricing plan, etc. As another example, for a telephone service, a calling plan, a call pricing plan, a call-waiting service, a caller ID service, an audio quality, a number of connectable communications devices, etc.

capability—an ability that has potential for use. Examples include the type of device (e.g., POTS telephone, IP phone (e.g., conforming to SIP, H.323, and/or MGCP/MEGACO, etc. protocols), fax, printer, scanner, computer, multimedia device, cordless, wireless, etc.); network connection of the device (e.g., POTS, cable, IP, ethernet, wireless, 802.11b, etc.); processing ability, memory, user interface, upgradablity, addressability, etc., of the device;

user connection address—an identifier via which other users can communicate via the service provider's network with the user, such as an e-mail address, a telephone number, an IP address, etc.

DETAILED DESCRIPTION

Internet telephony, packet communications, home networks, and other innovations are driving a need to change the way that communication devices (telephones, computers, multimedia devices, etc.) that attach to a service provider's network, are identified, provisioned, served, and billed. Opportunities exist to dramatically reduce the time/labor required to provision services on these new devices.

In certain exemplary embodiments, a "Network Agent" can control access to a service provider's network. The Network Agent can be implemented in software, firmware, and/or hardware. The Network Agent can be implemented in a network interface, network gateway, and/or within the network. The Network Agent can act as a proxy between a private network (e.g., wired or wireless, LAN, IP-based home and/or enterprise network) and the public network and/or can allow administration of the private/public boundary.

In certain exemplary embodiments, a user can:
1. Subscribe to a service provider network and obtain a "Network Agent" interface.
2. Obtain a new communications device (such as a handset or computer)
3. Use the new devices to access the service provider network provisioning process to request service
4. Have services authorized by the service provider
5. Provision services delivered by the service provider network A typical scenario might be as follows: a customer contacts a service provider to obtain service, and is provided with a high bandwidth connection (e.g. cable, DSL, fixed-wireless, fiber, or free-space optics, etc.) and a local "Network Agent" (perhaps housed in an interface unit such as a "set-top box") equipped with a wireless "home base stations". At this point the customer is free to purchase devices (e.g. telephones, computers, multimedia devices) at retail outlets (e.g., RadioShack, CompUSA) and bring them home. The devices could then register through the Network Agent with the service provider's network, could be provided with a suite of service options, and could be provided with a network connection/contact address (e.g. telephone number, e-mail address, IP address, username, etc.). Thus, communication devices can be identified and attached to a service provider's network and/or can be automatically provisioned for services. Such automatic provisioning can reduce labor costs for the service provider (by reducing and/or eliminating installation labor), increase customer adoption rate (by providing a low barrier to acceptance), and/or provide a competitive advantage over the LEC's (by providing faster service provisioning).

In certain exemplary embodiments, the process can be encapsulated in software that resides at the customer's premises inside the Network Agent, Interface Device, or Gateway and within the Network. With wireless gateways for IEEE 802.11b available at retail (buy.com, et cetera), this process can allow any Multiple System Operator (MSO) to offer second line voice services to cable modem customers, with little added cost.

FIG. 1 is a block diagram of an exemplary embodiment of a system 1000, which can comprise one or more communications devices 1100, 1200, 1300. Communications device 1100, 1200, and/or 1300 can be coupled, connected, and/or installed on a local area network 1400. Also coupled, connected, and/or installed on a local area network 1400 can be an information device 1500 running a network agent 1550, which can detect one or more capabilities 1120, 1220, 1320 of communications devices 1100, 1200, 1300, respectively.

Information device 1500 can be coupled, connected, and/or installed on a service provider's network 1600. Also coupled, connected, and/or installed on a service provider's network 1600, can be one or more servers 1700, 1800. Server 1700, possibly utilizing a database 1740 coupled thereto, can provide one or more services 1720 via network 1600 to agent 1550, and/or communications device 1100, 1200, and/or 1300. Server 1800, possibly utilizing a database 1840 coupled thereto, can provide one or more services 1820 via network 1600 to agent 1550, and/or communications device 1100, 1200, and/or 1300.

Each communications device 1100, 1200, 1300 can comprise a user interface 1140, 1240, 1340, respectively, via which one or more service options 1160, 1260, 1360, respectively, relating to the service provider's network 1600 can be rendered to a user of communications device 1100, 1200, 1300. Service options 1140, 1240, 1340 can relate to network 1600, services 1720, 1820 available via network 1600, and/or capabilities 1120, 1220, 1320 of communications devices 1100, 1200, 1300.

Figure 2:
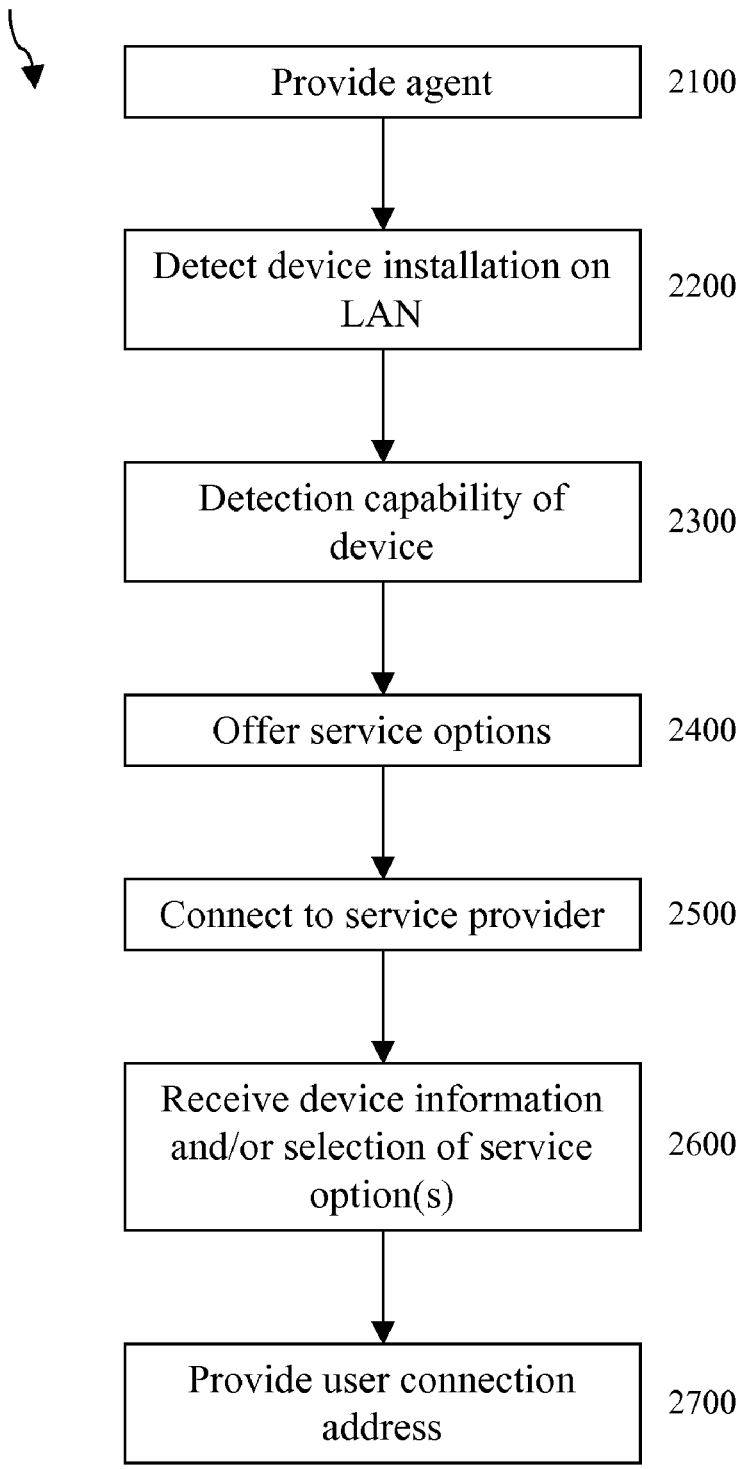
FIG. 2 is a flow diagram of an exemplary embodiment of a method 2000.

FIG. 2 is a flow diagram of an exemplary embodiment of a method 2000. At activity 2100, a network agent can be provided for installation on a user's premises. The agent can be provided upon user request. The agent can be adapted to couple to a service provider's network via a physical connection, which can comprise for example, a modem (e.g., cable, DSL, telephone, wireless), optical fiber connection, and/or free-space optics connection, etc. The agent can be adapted to couple to a local area network associated with the user's premises.

At activity 2200, the agent can automatically detect installation of a communications device on the local area network. The communications device can be any information device, such as a computer, telephone, multimedia device, etc.

At activity 2300, via a detector coupled to and/or integral to the agent, the agent can automatically detect one or more capabilities of the communications device.

At activity 2400, via a user interface of the communications device, a user can be automatically offered one or more user-selectable service options relating to the service provider's network, which can include one or more services and/or one or more servers. The one or more user-selectable service options can relate to at least one capability of the communications device. The user-selectable service options can be provided before, after, and/or irregardless of, registration of the communications device with the service provider's network.

At activity 2500, the communications device and/or network agent can be communicatively coupled to the service provider's network. Thus, the communications device and/or network agent can communicate with one or more agents, services, and/or servers on the service provider's network.

At activity 2600, the service provider's network can automatically receive from the communications device and/or network agent information sufficient to register the communication device and/or the network agent and/or one can receive or more user-selected service options. Based on the received information and/or service options, the service provider's network can authorize the user, the communications device, and/or the network agent to receive and/or access one or more services and/or servers of the service provider's network.

For example, upon registration of a communications device, and assuming that certain user-selectable service options have not yet already been provided by the agent, the network can provide user-selectable service options catered to the communications device. For instance, if the device is an IP phone lacking a display, the selectable service options can relate to non-visual user interface services, such as push button and/or spoken commands for voicemail management, call forwarding, caller ID, etc.

As another example, via registration and/or receipt of user-selectable service options, the service provider's network could recognize that the communications device is a telephone connected to the service provider's network via cable modem, and could then offer competitive local exchange carrier (CLEC) telephone service to the user and/or communications device.

As yet another example, via receipt of registration information and/or service options, the service provider's network could download an updated user manual, user interface, operating system, patch, security software, applications, clients, agents, wizards, set-up wizards, etc. to the communications device.

At activity 2700, the service provider's network can automatically provide a user connection address to the network agent and/or the communications device. The user connection address can be, for example, a telephone number, e-mail address, IP address, etc.

Upon provision of the user connection address, the communications device can utilize the user connection address to obtain one or more services (e.g., telephone service, IP telephony e-mail, newsgroups, FTP, web access, chat, voicemail, electronic fax, integrated messaging, etc.) from the service provider's network. Via the user connection address and/or the registration of the communication device and/or network agent, the service provider's network can account for a service provided to the communications device via the service provider's network.

Figure 3:
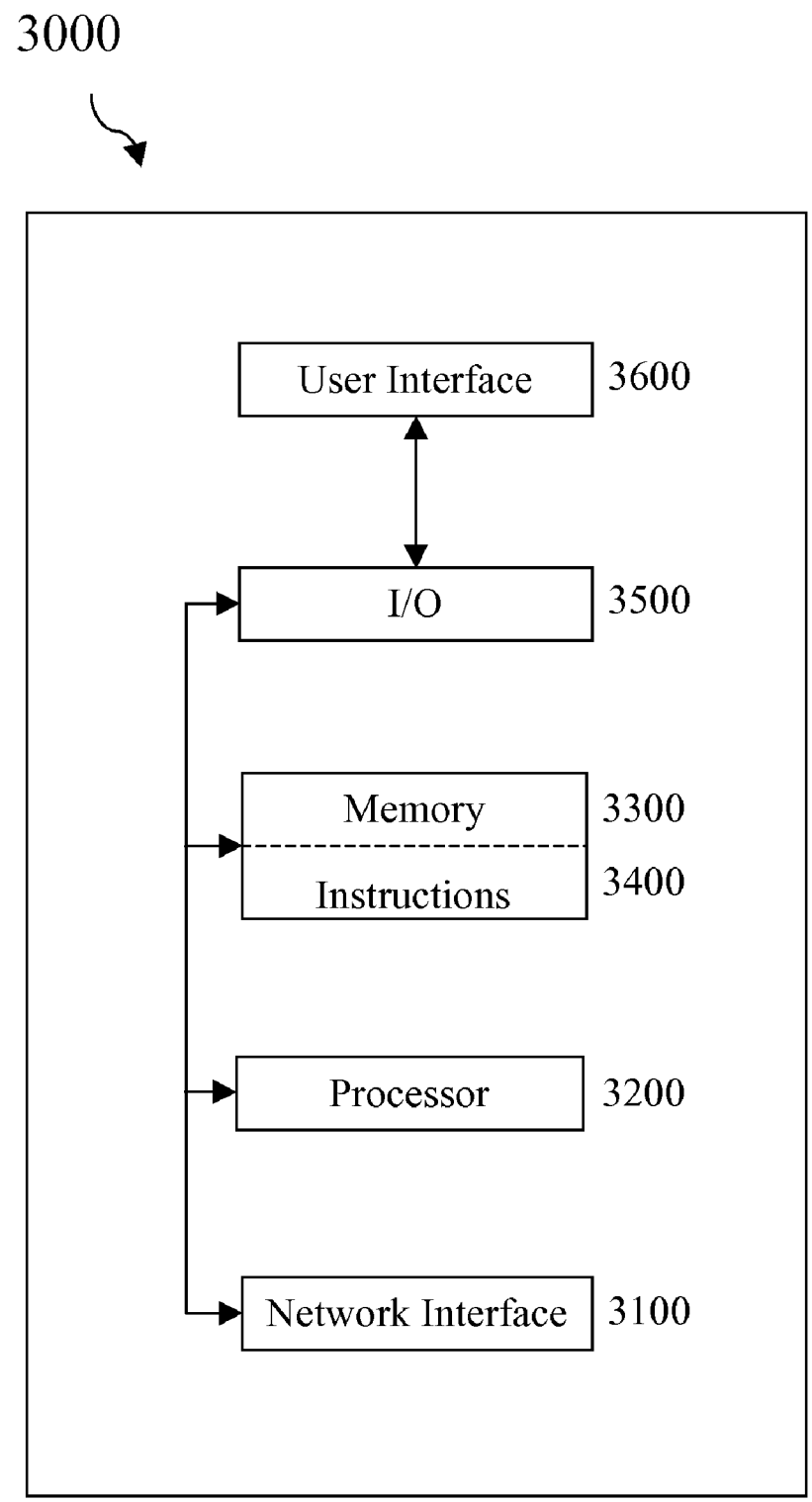
FIG. 3 is a block diagram of an exemplary embodiment of an information device 3000.

FIG. 3 is a block diagram of an exemplary embodiment of an information device 3000, which can represent any of communication devices 1100, 1200, 1300, 1500, and/or any servers 1700, 1800 of FIG. 1. Information device 3000 can comprise any of numerous well-known components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc. User interface 3600 can be used to render user-selectable service options to a user of information device 3000.

As used herein, the term "information device" means any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

As used herein, the term "network interface" means any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

As used herein, the term "processor" means a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

As used herein, a "memory device" means any hardware element capable of data storage, such as for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc.

As used herein, the term "firmware" means machine-readable instructions that are stored in a read-only memory (ROM). ROM's can comprise PROMs and EPROMs.

As used herein, the term "I/O device" means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

As used herein, the term "haptic" means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, fraction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

As used herein, the term "user interface" means any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc.

A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method comprising:
responsive to a request by a user for at least one service relating to a service provider's network, receiving, via a network interface device associated with a user, an agent configured for installation at a local network and configured to couple to the service provider's network via a physical connection at the local network;
automatically detecting, by the agent, an installation of a communications device at the local network, the communications device being a telephone lacking a display;
responsive to the agent detecting the installation of the communications device at the local network, automatically detecting, by the agent, at least one capability of the communications device; and
automatically offering, via the communications device, a plurality of user-selectable service options relating to the service provider's network and the at least one capability of the communications device as detected by the agent, the plurality of user-selected options related to a non-visual user interface service, and at least one user-selectable service option comprising an option for downloading an updated user manual.

2. The method of claim 1, further comprising:
registering the communications device with the service provider's network, the communications device coupled to the service provider's network via a cable modem, the plurality of user-selectable service option further comprising a competitive local exchange carrier telephone service.

3. The method of claim 1, further comprising:
accounting for service provided to the communications device via the service provider's network.

4. The method of claim 1, wherein the physical connection comprises a cable modem.

5. The method of claim 1, wherein the physical connection comprises a DSL modem.

6. The method of claim 1, wherein the physical connection comprises a telephone modem.

7. The method of claim 1, wherein the physical connection comprises a wireless modem.

8. The method of claim 1, wherein the physical connection comprises an optical fiber connection.

9. The method of claim 1, wherein the physical connection comprises a free-space optics connection.

10. The method of claim 1, wherein the non-visual user interface services comprise push button services for caller ID.

11. The method of claim 1, further comprising:
providing a user connection address, wherein the user connection address is a telephone number.

12. The method of claim 1, further comprising:
providing a user connection address, wherein the user connection address is an e-mail address.

13. The method of claim 1, further comprising:
providing a user connection address, wherein the user connection address is an IP address.

14. A non-transitory computer readable medium comprising computer executable instructions for activities comprising:
responsive to a request by a user for at least one service relating to a service provider's network, receiving, via a network interface device associated with a user, an agent configured for installation on a local network and configured to couple to the service provider's network via a physical connection at the local network;
automatically detecting, by the agent, an installation of a communications device at the local network, the communications device being a telephone lacking a display;
responsive to the agent detecting the installation of the communications device at the local network, automatically detecting, by the agent, at least one capability of the communications device; and
automatically offering, via the communications device, a plurality of user-selectable service options relating to the service provider's network and the at least one capability of the communications device as detected by the agent, the plurality of user-selected options related to a non-visual user interface service.

15. A system comprising:
an agent configured to be received, via a network interface device, in response to a request by a user for at least one service relating to a service provider's network;
the agent further configured for installation at a local network;
the agent further configured to couple to a service provider's network via a physical connection at the local network;
a communications device installed on the local network, the communications device being a telephone lacking a display;
the agent further configured to automatically detect the installation of the communications device at the local network;
the agent further configured to automatically detect at least one capability of the communications device responsive to the agent detecting the installation of the communications device at the local network; and
the communications device configured to offer a plurality of user-selectable service options relating to the service provider's network and the at least one capability of the communications device as detected by the agent, the user-selected options related to a non-visual user interface service.

\* \* \* \* \*